(12) United States Patent
Williams et al.

(10) Patent No.: US 9,798,646 B2
(45) Date of Patent: Oct. 24, 2017

(54) PERFORMANCE MONITORING IN A DATA PROCESSING APPARATUS CAPABLE OF EXECUTING INSTRUCTIONS AT A PLURALITY OF PRIVILEGE LEVELS

(71) Applicant: ARM LIMITED, Cambridge (GB)

(72) Inventors: Michael John Williams, Cambridge (GB); Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 62 days.

(21) Appl. No.: 14/747,141

(22) Filed: Jun. 23, 2015

(65) Prior Publication Data

US 2016/0048440 A1    Feb. 18, 2016

(30) Foreign Application Priority Data

Aug. 15, 2014 (GB) .................................. 1414546.0

(51) Int. Cl.
| | | |
|---|---|---|
| *G06F 11/34* | (2006.01) | |
| *G06F 11/14* | (2006.01) | |
| *G06F 11/30* | (2006.01) | |

(52) U.S. Cl.
CPC ........ *G06F 11/348* (2013.01); *G06F 11/1484* (2013.01); *G06F 11/301* (2013.01); *G06F 11/3024* (2013.01); *G06F 11/3409* (2013.01); *G06F 11/3466* (2013.01); *G06F 11/3433* (2013.01); *G06F 2201/815* (2013.01); *G06F 2201/86* (2013.01)

(58) Field of Classification Search
CPC .. G06F 11/348; G06F 11/1484; G06F 11/301; G06F 11/3024; G06F 11/3409; G06F 11/3466; G06F 11/3433; G06F 2201/86; G06F 2201/815
USPC ........................................................ 726/23
See application file for complete search history.

(56) References Cited

U.S. PATENT DOCUMENTS

| | | |
|---|---|---|
| 5,657,253 A | 8/1997 | Dreyer et al. |
| 2007/0043531 A1 | 2/2007 | Kosche et al. |
| 2009/0249049 A1 | 10/2009 | Weissman et al. |
| 2011/0093750 A1 | 4/2011 | Williams et al. |
| 2012/0254670 A1 | 10/2012 | Frazier et al. |

OTHER PUBLICATIONS

Search Report for GB1414546.0 dated Feb. 9, 2015, three pages.
Extended European Search Report dated Dec. 14, 2015 issued in EP 15172907.6, 9 pages.

*Primary Examiner* — Kambiz Zand
*Assistant Examiner* — Benjamin Kaplan
(74) *Attorney, Agent, or Firm* — Nixon & Vanderhye P.C.

(57) ABSTRACT

A data processing apparatus has processing circuitry which can execute instructions at one of several privilege levels. A plurality of performance monitoring circuits are included. In response to an instruction executed at a first privilege level, first configuration data can be set for controlling performance monitoring by a first subset of performance monitoring circuits. A disable control flag can be set in response to an instruction executed at a second privilege level higher than the first privilege level. If the disable control flag has a predetermined value then performance monitoring control circuitry disables performance monitoring by the first subset of performance monitoring circuits while the processing circuitry is executing instructions at the second privilege level.

14 Claims, 4 Drawing Sheets

PERFORMANCE MONITORING IN A DATA PROCESSING APPARATUS CAPABLE OF EXECUTING INSTRUCTIONS AT A PLURALITY OF PRIVILEGE LEVELS

BACKGROUND

This application claims priority to GB Patent Application No. 1414546.0 filed 15 Aug. 2014, the entire content of which is hereby incorporated by reference.

The present technique relates to the field of data processing. More particularly, it relates to a data processing apparatus having performance monitoring circuits and capable of executing instructions at one of a plurality of privilege levels.

A data processing apparatus may have a number of performance monitoring circuits for monitoring various aspects of the performance of the apparatus. For example, the performance monitoring circuits may include counters which count the occurrence of various events within the processor, such as the number of instructions that have been executed, the number of cache accesses, etc, which can provide information about processing performance. This maybe useful for example for verifying whether software is executed efficiently, or for load balancing between multiple processing circuits.

Some processing apparatuses may support execution of program instructions at a number of different privilege levels, where the processing circuitry when executing at one privilege level may have access to resources or other capabilities that it would not have when executing at a different privilege level. The present technique seeks to improve performance monitoring in such a system.

SUMMARY

Viewed from one aspect, the present technique provides a data processing apparatus comprising:

processing circuitry configured to execute program instructions at a plurality of privilege levels; and a plurality of performance monitoring circuits, wherein the processing circuitry is configured to set, in response to at least one program instruction executed by the processing circuitry at a first privilege level, first configuration data for controlling performance monitoring by a first subset of performance monitoring circuits;

the processing circuitry is configured to set a disable control flag in response to at least one program instruction executed by the processing circuitry at a second privilege level higher than the first privilege level; and the apparatus comprises performance monitoring control circuitry configured to disable performance monitoring by said first subset of performance monitoring circuits while the processing circuitry is executing instructions at the second privilege level if the disable control flag has a predetermined value.

Viewed from another aspect, the present technique provides a data processing apparatus comprising:

processing means for executing program instructions at a plurality of privilege levels; and a plurality of performance monitoring means for performing performance monitoring, wherein the processing means is configured to set, in response to at least one program instruction executed by the processing means at a first privilege level, first configuration data for controlling performance monitoring by a first subset of performance monitoring means;

the processing means is configured to set a disable control flag in response to at least one program instruction executed by the processing means at a second privilege level higher than the first privilege level; and the apparatus comprises performance monitoring control means for disabling performance monitoring by said first subset of performance monitoring means while the processing means is executing instructions at the second privilege level if the disable control flag has a predetermined value.

Viewed from a further aspect, the present technique provides a performance monitoring method for a data processing apparatus comprising a plurality of performance monitoring circuits, comprising:

in response to at least one program instruction executed at a first privilege level, setting first configuration data for controlling performance monitoring by a first subset of performance monitoring circuits; and disabling performance monitoring by said first subset of performance monitoring means if the data processing apparatus is executing program instructions at a second privilege level higher than the first privilege level and a disable control flag set in response to at least one instruction executed at the second privilege level has a predetermined value.

DESCRIPTION OF EXAMPLE EMBODIMENTS

Figure 1:
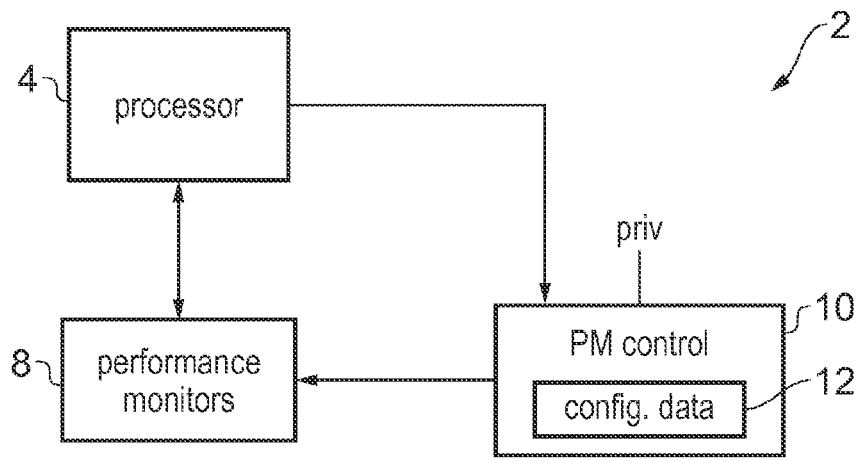
FIG. 1 schematically illustrates a portion of a data processing apparatus having performance monitoring circuits.

In a data processing apparatus supporting a plurality of privilege levels and having a number of performance monitoring circuits, a first subset of the performance monitoring circuits may be configurable by code executing at a first privilege level. For example, the code executing at the first privilege level may be allowed to configure how the first subset of performance monitoring circuits monitor performance, such as configuring whether the performance monitoring circuits are active and if they are active, what events they track or what type of performance monitoring is being performed.

However, the processing circuitry may then switch to executing code at a second privilege level which is higher than the first privilege level. Sometimes, it may be appropriate for the performance monitoring circuits configured at the first privilege level to continue to monitor performance as code is being executed at the second privilege level. For example, in a virtualised system where the first privilege level corresponds to an operating system and the second privilege level corresponds to a hypervisor, traps to the hypervisor impact on performance of code managed by the operating system at the first privilege level, and so to allow the programmer of the operating system or applications in the operating system to track the actual performance of the code, it may be desirable to allow the performance monitoring circuits to continue monitoring even when the processing circuitry switches to the second privilege level. However, the inventors of the present technique recognised that on other occasions it may be inappropriate for the performance monitoring circuits configured by the first privilege level to continue operating when in the second privilege level. For example, the second privilege level may be called to perform a security-critical task such as checking a password. If so, then the performance monitoring circuits configured at the first privilege level could be used gain information about the security-critical task performed at the second privilege level, which could compromise security. For example, if the code at the first privilege level configures one of the first subset of performance monitoring circuits to count the number of elapsed processing cycles while the password is being checked, then this may indicate that the password got further through the checking process than if only a few cycles elapsed, indicating that more of the password is correct than on a previous attempt. This type of information could help reduce the number of permutations to help crack the password. Therefore, sometimes it may be extremely undesirable for the first subset of performance monitoring circuits configured at the first privilege level to continue monitoring performance when the processing circuitry is executing code at the second previous level.

To address this problem, a disable control flag is provided which may be set in response to an instruction executed at the second privilege level. Performance monitoring control circuitry is provided (in hardware) to disable performance monitoring by the first subset of performance monitoring circuits while the processing circuitry is executing instructions at the second privilege level if the disable control flag has a predetermined value. Hence, the code executing at the second privilege level can select whether to hide itself from performance monitoring circuits configured at the first privilege level, to improve security.

As well as the first subset of performance monitoring circuits, there may also be a second subset of performance monitoring circuits which are configured in response to instructions executed at the second privilege level. Hence the code at the second privilege level may configure its own set of performance monitoring circuits independently from the first subset of performance monitoring circuits configured by the first privilege level. In some cases the code at the second privilege level may also be able to configure the first subset as well as the second subset, but the code at the first privilege level may be prevented from configuring the performance monitoring circuits within the second subset. Similarly, for accessing the information recorded by the performance monitoring circuits, the code at the second privilege level may have access to both the first and second subsets of performance monitoring circuits, while the code at the first privilege level may only have access to the first subset. Alternatively, in some cases the code at the second privilege level may be able to select whether code at the first privilege level can access the performance data recorded by the second subset of performance monitoring circuits.

When performance monitoring by the first subset of performance monitoring circuits is disabled by the control circuitry because the disable control flag has been set by the code at the second privilege level and the processing circuitry is currently in the second privilege level, performance monitoring by the second subset of performance monitoring circuits may still be permitted. Hence, the disable control flag only affects the first subset of performance monitoring circuits and does not impact on performance monitoring by the second subset.

The allocation of which performance monitoring circuits are part of the first subset and which performance monitoring circuits are part of the second subset may be fixed in some embodiments. For example there may be a fixed number of performance monitoring circuits configurable at the first privilege level and another fixed number of performance monitoring configurable at the second privilege level.

However, in some cases it may be more efficient to be able to reallocate particular performance monitoring circuits to be part of the first subset or second subset as appropriate. For example, the code at the second privilege level may not always need the same number of performance monitoring circuits. To avoid providing a larger number of performance monitoring circuits to satisfy the greatest possible number of performance monitoring circuits required by each of the first and second privilege levels, it can be more efficient to provide a common set of performance monitoring circuits and then to reallocate particular performance monitoring circuits as one of the first subset or second subset as required. The allocation data for controlling this may be set by the processing circuitry in response to an instruction executed at the second privilege level. Hence, the code at the second privilege level may be responsible for partitioning the performance monitoring circuits into the first and second subsets, and code at the first privilege level may not be allowed to set the allocation data.

The allocation data may have various forms. In one example, each performance monitoring circuit could have a flag which indicates whether it is part of the first or second subset. However, this may require a relatively large amount of data.

A particularly efficient way of representing the allocation data is for the performance monitoring circuits to have a predetermined sequence with each circuit having a predetermined position within the sequence, and for the allocation data to indicate a boundary position within the sequence. The first subset of performance monitoring circuits may then comprise the performance monitoring circuits on one side of the boundary position and the second subset may comprise at least the performance monitoring circuits on the other side of the boundary position. In this way, a simple indication of a boundary position is enough to identify which circuits are part of each subset. For example each performance monitoring circuit may have an associated index and the first subset of performance monitoring circuits may be those circuits having indices which are greater than (or less than) an index represented by the boundary position.

The disable control flag may only affect performance monitoring of the first subset of performance monitoring circuits when the processing circuitry is executing instructions at the second privilege level. Hence, when at the first privilege level, then even if the disable control flag has the predetermined value, performance monitoring by the first subset of performance monitoring circuits may still be permitted. In this way, the number of instructions required by the second privilege level for setting and clearing the disable control flag can be reduced since it is not necessary to clear the disable control before switching back to the first privilege level because the disable control flag will not affect performance monitoring at the first privilege level.

The performance monitoring circuits may comprise various forms. Some performance monitoring circuits may monitor a relatively complex metric of performance or may log particular events or output signals if particular combinations of events occur. However, often the performance monitoring circuits may comprise event tracking circuits which track the occurrence of selected events within the data process. For example the event tracking circuits may comprise event counters which increment a counter each time a particular event occurs. Other forms of event tracking circuits may not be monotonically increasing, and may instead output a signal if a certain number of events have occurred of a particular type.

Some event tracking circuits may be programmable to track the occurrence of a type of event which is specified by the first configuration data set by code at the first privilege level. Hence, the code at the first privilege level may select one of a number of types of events that are to be counted. Other types of event tracking circuits may be fixed so that they track the occurrence of a fixed predetermined type of event and so cannot be reprogrammed to track other events. For example, there may be some events, such as the elapse of a processing cycle, which often need to be monitored and so it may be more efficient to provide a fixed event counter dedicated to tracking this type of event. The first subset of performance monitoring circuits may comprise fixed event tracking circuits, programmable event tracking circuits, or both, and performance monitoring by these performance monitoring circuits may be disabled if the processing circuitry is in the second privilege level and the disable control flag has been set.

The first configuration data which is set by instructions at the first privilege level may include data specifying which type of event is to be tracked by a programmable event tracking circuit. Also, the first configuration data may comprise enable data for controlling whether performance monitoring by a particular performance monitoring circuit is currently enabled or disabled. However, this enable data set in the first configuration data may be overridden by the disable control flag so that even if the first configuration data indicates that a particular performance monitoring circuit should be enabled, if the processing circuitry switches to the second privilege level and the disable control flag is at the predetermined value then that performance monitoring circuit should still be disabled.

Similarly, the second configuration data set by code at the second privilege level for the second subset of performance monitoring circuits may comprise enable data for enabling or disabling individual performance monitoring circuits. In some cases the second configuration data may also include a global enable value for disabling a first subset of performance monitoring circuits, so that the code at the second privilege level can optionally choose to disable counting or performance monitoring by the first subset of performance monitoring circuits completely regardless of which mode the processing circuitry is currently in. Also, the second configuration data may include data defining the type of event to be counted by a programmable event tracking circuit within the second subset. The second subset may also include fixed event tracking circuits as discussed above.

In some cases, the first or second configuration data may also specify which privilege level can access the performance data obtained by the corresponding first or second subsets of performance monitoring circuits.

In some examples, the data processing apparatus may support virtualisation where one or more operating systems may run under the supervision of a hypervisor. This can be useful for example to support several different types of operating systems, such as a real time operating system for handling real time critical processing and a second operating system for handling processing which is less real time critical. For example, some processors for automotive applications may provide a real time operating system for controlling the braking system or other safety-critical components, and another operating system for controlling more graphics user interface (GUI) rich features, such as controlling the audio system for a vehicle. In a system supporting virtualisation, the second privilege level may correspond to a hypervisor privilege level for executing a hypervisor program and the first privilege level may correspond to an operating system privilege level for executing one or more operating system programs. Hence, with the present technique a hypervisor can selectively hide itself from performance monitoring circuits configured by the operating system.

In another example, the data processing apparatus may support at least one secure privilege level and at least one less secure privilege level, where in the at least one secure privilege level the processing circuitry has access to at least one resource that is inaccessible in the less secure privilege level. For example, to protect firmware or content against copying the secure privilege level may be used. An example of this type of system is the Trustzone architecture provided by ARM Limited of Cambridge UK. Hence, the second privilege level may comprise the at least one secure privilege level and the first privilege level may comprise the at least one less secure privilege level. This allows code in the secure privilege level to selectively hide itself from performance monitoring circuits configured in the less secure state, to maintain asset protection.

Other systems may combine virtualisation with the secure and less secure domains so that within one or both of the secure and less secure states there is a hypervisor and an operating system. In this case, the relative hierarchy between the different security states and the hypervisor or operating system levels may be chosen by the system designer. In general, the second privilege level may be any state that is considered more privileged than the first privilege level.

Some examples may have more than two privilege levels, and so there may for example be a third privilege level which has lower privilege than the first privilege level. The third privilege level may have a third subset of performance monitoring circuits which can be configured in response to instructions executed at the third privilege level. In this case, it may be desirable for multiple privilege levels to each be able to hide themselves from performance monitoring circuits configured at a lower privilege level. Hence, in addition to the disable control flag set for the second privilege level as discussed above, there may be a further disable control flag set by code at the first or second privilege level which, when set to a predetermined value, disables performance monitoring by the third subset of performance monitoring circuits while executing instructions at the first or second privilege level. This approach can be repeated several times so that each privilege level can disable performance monitoring by performance monitoring circuits configured at a lower privilege level when the processing circuitry is currently in the higher privilege level, using a corresponding disable control flag.

When there are multiple sets of configuration data for configuring different subsets of performance monitoring circuits, in some cases each set of configuration data may be stored in a common register or a common set of registers, or in other cases may be stored separately. In general, the configuration data is any stored data which controls performance monitoring by the corresponding subset of performance monitoring circuits. In some cases there may be some overlap between the first, second and third configuration data corresponding to any overlap in the first, second and third subsets.

FIG. 1 illustrates part of a data processing apparatus 2 having processing circuitry 4 which supports execution of program instructions at a plurality of privilege levels. The apparatus 2 has a number of performance monitoring circuits 8 for monitoring performance of the processor 4 and other parts of the data processing apparatus 2. For example, the performance monitoring circuits 8 may comprise a number of event counters which count the occurrences of particular events, and then software may read out the count value stored by the counters in order to determine how many events have occurred. This can be useful for several reasons. Firstly, software developers may be interested in how many events of a particular type occur while executing their software, to help optimize the software code to run more efficiently. For example, the number of memory accesses, cache misses, or instructions executed could be counted. Also, multi-core systems may use the performance data to control load balancing for example.

The performance monitoring by the performance monitoring circuits 8 is controlled by performance monitoring control circuitry 10 which maintains configuration data 12 defining whether and how the performance monitoring should be performed. The processor 4 can update the configuration data 12 in response to instructions to select to how the performance monitoring is to proceed. Performance monitoring may be dependent on which privilege level the processing circuitry 4 is currently executing program instructions in and so the performance monitoring control circuitry 10 may receive an indication of the privilege level.

Figure 2:
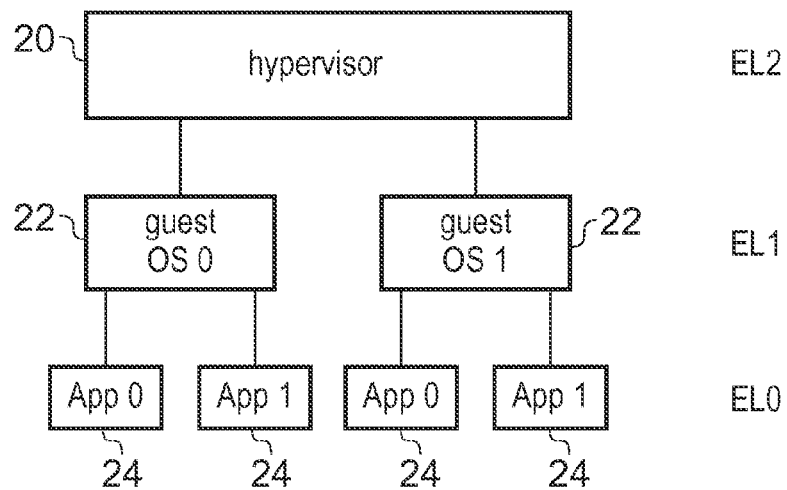
FIG. 2 shows an example of different privilege levels in a system supporting virtualisation.

FIG. 2 shows a first example of different privilege levels supported by the processing circuitry 4. In this example the processor 4 supports virtualisation so that software may be provided with an execution environment which appears to have one form from the point of view of the software, whereas in reality the underlying hardware has a different physical form. For example, processing circuitry 4 may execute a hypervisor program 20 at a second privilege level EL2 which is responsible for managing the virtualisation and hiding details of the underlying hardware from one or more guest operating systems 22 executed at a first privilege level EL1. The guest operating systems 22 may be presented by the hypervisor 20 with an interface to the processor 4 which may be different from the physical reality. For example the hypervisor 20 may hide certain resources from the guest operating system 22 or may provide a representation of a physical resource which is not actually present. The virtualisation may be implemented by the hypervisor software 20 trapping accesses to physical resources in software and then managing the response to the underlying guest operating system 22 so as to give the appropriate response which matches the response which would be received if the underlying physical resource was actually present. Meanwhile, the guest operating systems 22 manage the execution of a number of applications 24 which are processed at a further privilege level EL0. The different guest operating systems 22 may have different characteristics. For example one guest operating system may support real time processing while another may not.

Figure 3:
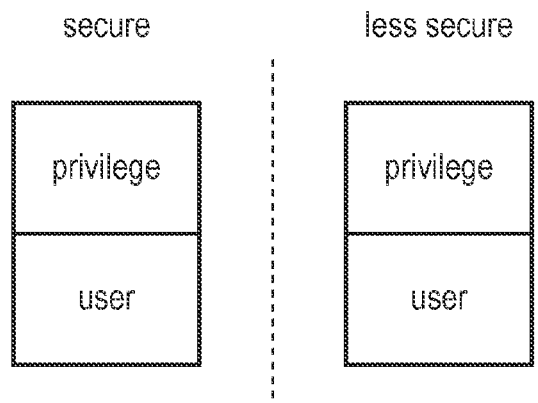
FIG. 3 shows an example of different privilege levels in a system having secure and less secure domains.

FIG. 3 shows another example of different privilege states supported by the processing circuitry 4. In this example, the processing circuitry 4 has a secure domain and a less secure domain which may be separated to protect content or firmware in the secure domain from access by code running in the less secure domain. Separation between less secure and secure states may be implemented in hardware or software. Within each domain, there may also be a privileged state and a user state, where in the privileged state the processing circuitry 4 has access to resources which are not available in the user state. Similarly, in the secure domain the processor may have access to resources not available in the less secure domain. An example of a system supporting secure and less secure domains is the Trustzone architecture provided by ARM Ltd of Cambridge, UK. Hence, there may be a number of states (secure privileged, secure user, less secure privileged, less secure user) which may be considered to have a hierarchy of privilege. For example, in some embodiments the secure user state may be considered to be more privileged than the less secure privileged state.

Hence, as shown in FIG. 2 and FIG. 3, there may be various reasons why a processor 4 may be provided with multiple levels of privilege. In general, in the subsequent discussion a more privileged level is indicated with a higher numeric value (e.g. EL2) than a less privileged state (e.g. EL0), but other systems may use a different convention.

Figure 4:
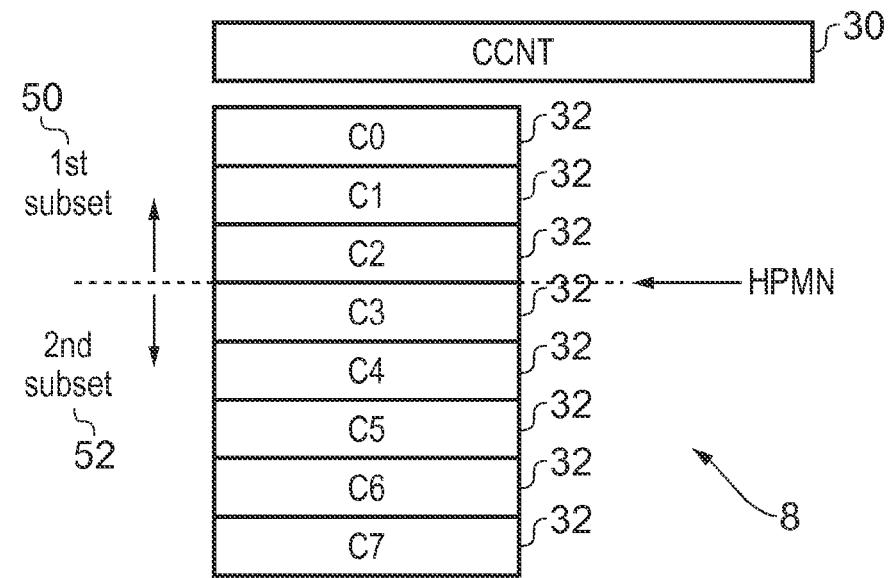
FIG. 4 shows an example of a set of performance monitoring circuits with configuration data for configuring the performance monitoring circuits.
Figure 4:
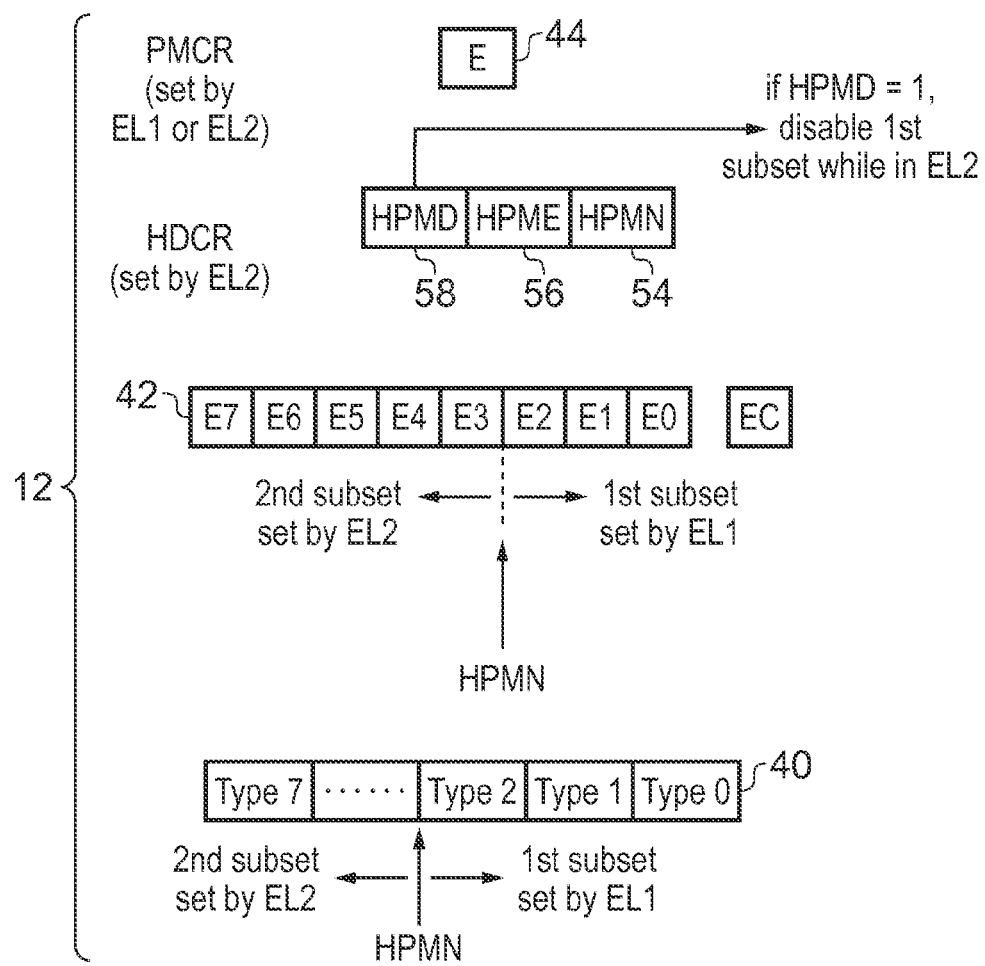

FIG. 4 illustrates in more detail an example of the performance monitoring circuits 8 and the configuration data 12 for configuring the performance monitoring circuits. As shown in the top part of FIG. 4, the performance monitoring circuits may include a number of event counters 30, 32. The event counters each count occurrences of a particular event and can be read and written to by software executing on the processor 4. In this example, the counters include a fixed event counter 30 which counts a fixed type of event and cannot be reprogrammed to count a different type of event. For example, in this embodiment the fixed event counter 30 counts the elapse of processing cycles. This is useful because counting processing cycles is a very common form of performance monitoring and so it is likely that this will be required often. As the number of elapsed processing cycles will typically be higher than the number of occurrences of another type of event, the cycle event counter 30 may have a greater number of bits to support a higher count value than the other types of counter.

The other event counters 32 are programmable event counters which can be configured by software to count different types of events as specified by the configuration data 12. For example, the event to be counted can be selected from a number of events such as: an instruction being executed, an exception being taken, an exception return being executed, a program counter being changed in software, a processing cycle elapsing, a data memory or cache being accessed, an instruction cache being accessed, a particular type of exception being taken, a cache miss or line fill occurring, or a TLB (translation lookaside buffer) being refilled. It will be appreciated that this list is non-exhaustive and many other types of event could be counted. The configuration data in this example includes an event type register 40 which comprises a number of fields each corresponding to a programmable event counter 32, and to which the processor 4 can write an event type value defining the event to be counted by the corresponding counter. The fixed event counter 30 does not have a corresponding field even type register 40. In another embodiment, each programmable event counter 32 may have a corresponding configuration register including an event type field defining the type of event to be counted.

The configuration data 12 also includes an enable register 42 which includes a number of fields, one for each event counter 30, 32. Each field comprises a bit which selects whether the performance monitoring counter is enabled or disabled. When enabled, the corresponding counter increments its count value in response to each occurrence of the type of event being counted. If disabled, then even if that type of event occurs, the counter is not incremented. Again, in another embodiment, the enable fields for each counter could be implemented within separate configuration registers for each counter.

In a system having multiple privilege levels as discussed above, some of the event counters may be configurable by one privilege level (e.g. EL1 in this example) while other event counters may be reserved for configuration by a higher privilege level EL2. Hence, as shown in FIG. 4, the event counters may include a first subset 50 which are configurable at the first privilege level EL1 and a second subset 52 which are configurable at the second privilege level EL2. In this example, the fixed event counter 30 is included in the first subset 50, but in other examples it may be in the second subset. The code at the second privilege level EL2 can set a boundary defining value 54 (referred as HPMN herein) which indicates a boundary position within a sequence of the performance counters 32. Code at the first privilege level EL1 cannot access the boundary defining value 54. For example, in this example the boundary position has been set to be between event counter C2 and event counter C3 so that the event counters on one side of the boundary (CCNT and C0 to C2) are considered to be the first subset 50 and event counters on the other side of the boundary (C3 to C7) are in the second subset 52. Hence, code at the second privilege level EL2 may have access to all the event counters and may typically use the second subset 52 for its own purposes. Code at the first privilege level EL1 may not have access to the second subset and cannot configure these event counters. The code at the first privilege level EL1 may be restricted to configuring the first subset of event counters. Hence, in the type register 40 and enable register 42, the boundary value 54 may also control which fields can be written to by the code at the first privilege level EL1. Hence, at the first privilege level EL1, the performance monitoring control circuitry 10 may prevent reads or writes to the fields of the type and enable registers 40, 42 corresponding to the second subset. The code at the second privilege level can write to any field of the type and enable registers 40, 42.

The configuration data includes a first enable value 44 (PMCR.E) which is programmable by code at the first privilege level EL1 or second privilege level EL2 to enable or disable performance monitoring by the event counters 30, 32 in the first subset 50. This allows performance monitoring to be disabled without losing the individual bits in the enable register 42 so that when performance monitoring is later enabled again, the same counters which were previously enabled can resume counting.

The code at the second privilege level may also have a second enable value 56 (HPME) which controls whether performance monitoring by the second subset 52 of event counters is enabled or disabled. The second enable value 56 is programmable by code at the second privilege level EL2, and is not accessible to code at the first privilege level EL1.

As discussed above, code at the first privilege level EL1 may configure the first subset of performance counters 52 to count events. However, the processor 4 may then switch to the higher privilege level EL2. If the performance counters configured by the first privilege level EL1 then continue counting events, then this may provide information about the operations at the higher privilege level EL2, which may be undesirable for security reasons. For example if the higher privilege level is protecting secure content or performing a security critical task such as checking passwords or other authentication data, then the number of cycles elapsed, number of instructions executed etc. may give information about the secure processing, which could make the system more vulnerable to attacks or security breaches. Therefore sometimes it may be desirable for the code at the higher privilege level at EL2 to be able to disable performance counting by performance counters in the first subset 50 configured at the lower privilege level EL1. On other occasions, performance counting by the counters configured at the lower privilege level may be entirely appropriate, since this will give a proper indication of the performance of code at the first privilege level EL1. For example, traps to the hypervisor at privilege level EL2 in the example shown in FIG. 2 affect the overall performance of the applications 24 or guest operating system 22 at lower privilege levels, and so it may be reasonable for the hypervisor 20 to allow performance counters configured at lower privilege levels to continue to count events.

To address this, a disable control flag 58 (HPMD) is provided which can be set by code executing at the second privilege level EL2, but is inaccessible to code executing at the first privilege level EL1. If the disable control flag is 0 then performance monitoring by the first subset of performance counters 50 continues when processing in the second privilege level EL2. However, if the disable control flag 58 is set to 1 by the code at EL2, then any counters within the first subset 50 are disabled from counting while the processing circuitry 4 is executing code in the second privilege level EL2. The disable control flag 58 does not affect counting by performance counters in the second subset 52 and so these continue as normal. Similarly, if the processor 4 is in the first privilege level EL1 or a lower privilege level then the disable control flag 58 also does not affect counting by the first subset 50. Hence, by using the disable control flag 58 the code at the second privilege level EL2 can choose whether or not to hide itself from performance counters within the first subset 50.

Figure 5:
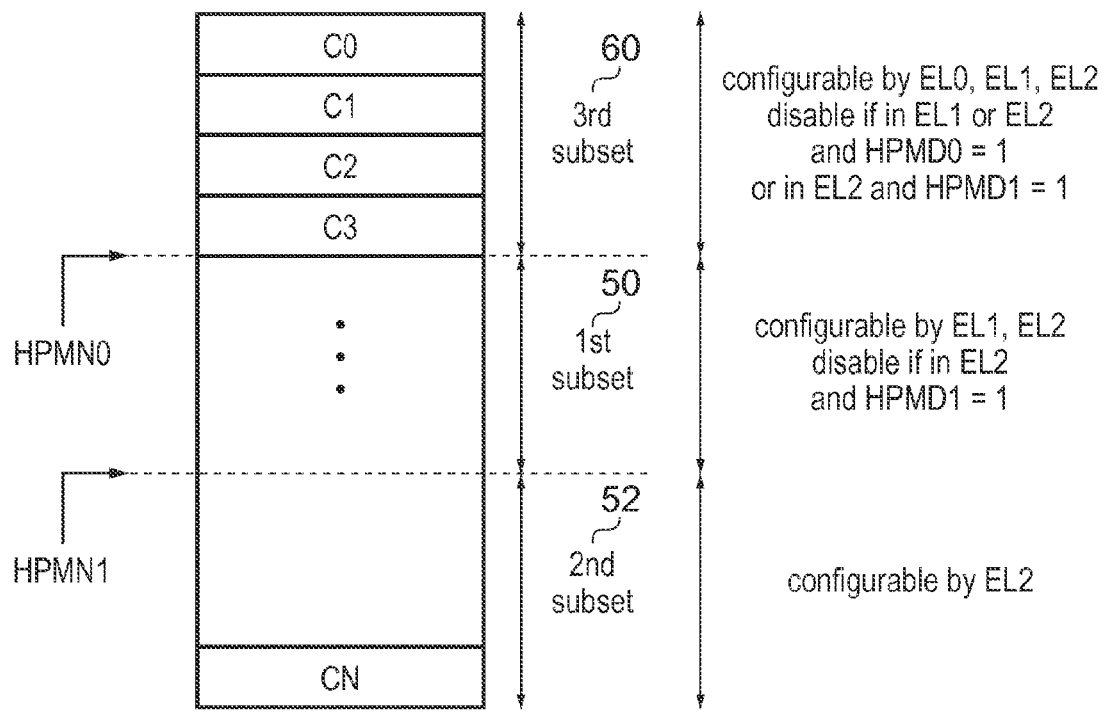
FIG. 5 shows an example of performance monitoring circuits configurable by a hierarchy of privilege levels.

FIG. 5 shows another example in which the performance counters may be partitioned into further subsets corresponding to three or more privilege levels. Hence, as well as the first and second subset 50, 52 discussed in FIG. 4, there is a third subset of performance counters 60. The second subset 52 of performance counters may be configurable by instructions executed at the second privilege level EL2. The first subset 50 of performance counters may be configurable by instructions executed at both the first privilege level EL1 and second privilege level EL2. The third subset 60 of performance counters may be configurable by instructions executed at any of the privilege states EL0, EL1, EL2. In this case, a hierarchical set of configuration data may be provided including the following values:

PMCR.E (enable flag 44) is programmable by program instructions executed at EL0, EL1 and EL2, and enables/disables the third subset 60.

HDCR0.HPME0 (further second enable flag 66) is programmable by program instructions executed at EL1 or EL2, and enables/disables the first subset 50.

HDCR1.HPME1 (second enable flag 56) is programmable by program instructions executed at EL2, and enables/disables the second subset 52.

HDCR0.HPMD0 (further disable control flag 68) is programmable by program instructions executed at EL1 or EL2, and disables the third subset 60 when the processing circuitry is executing instructions at EL1 or EL2.

HDCR1.HPMD1 (disable control flag 58) is programmable by program instructions executed at EL2, and disables the first subset 50 and third subset 60 when the processor 4 is executing instructions at EL2.

HDCR0.HDMN0 (further boundary defining value 64) is programmable by program instructions executed at EL1 or EL2 and sets the partitioning between the first subset 50 and the third subset 60.

HDCR1.HDMN1 (boundary defining value 54) is programmable by program instructions executed at EL2 and sets the partitioning between the first subset 50 and the second subset 52.

In this way, each higher privilege level may partition the performance counters into a subset configurable by itself and a subset configurable at a lower privilege state, and may selectively disable performance counting by counters configurable at lower privilege states when processing is currently in the higher privilege state. Each subsequent privilege level may then set similar controls for lower privilege states. For example, if there are further privilege levels below EL0 then the third subset 60 may further be partitioned and controlled by code executed at EL0 in a similar way to the way which the third subset 60 is controlled by code at EL1 and the first subset 50 is controlled by code at EL2.

Figure 6:
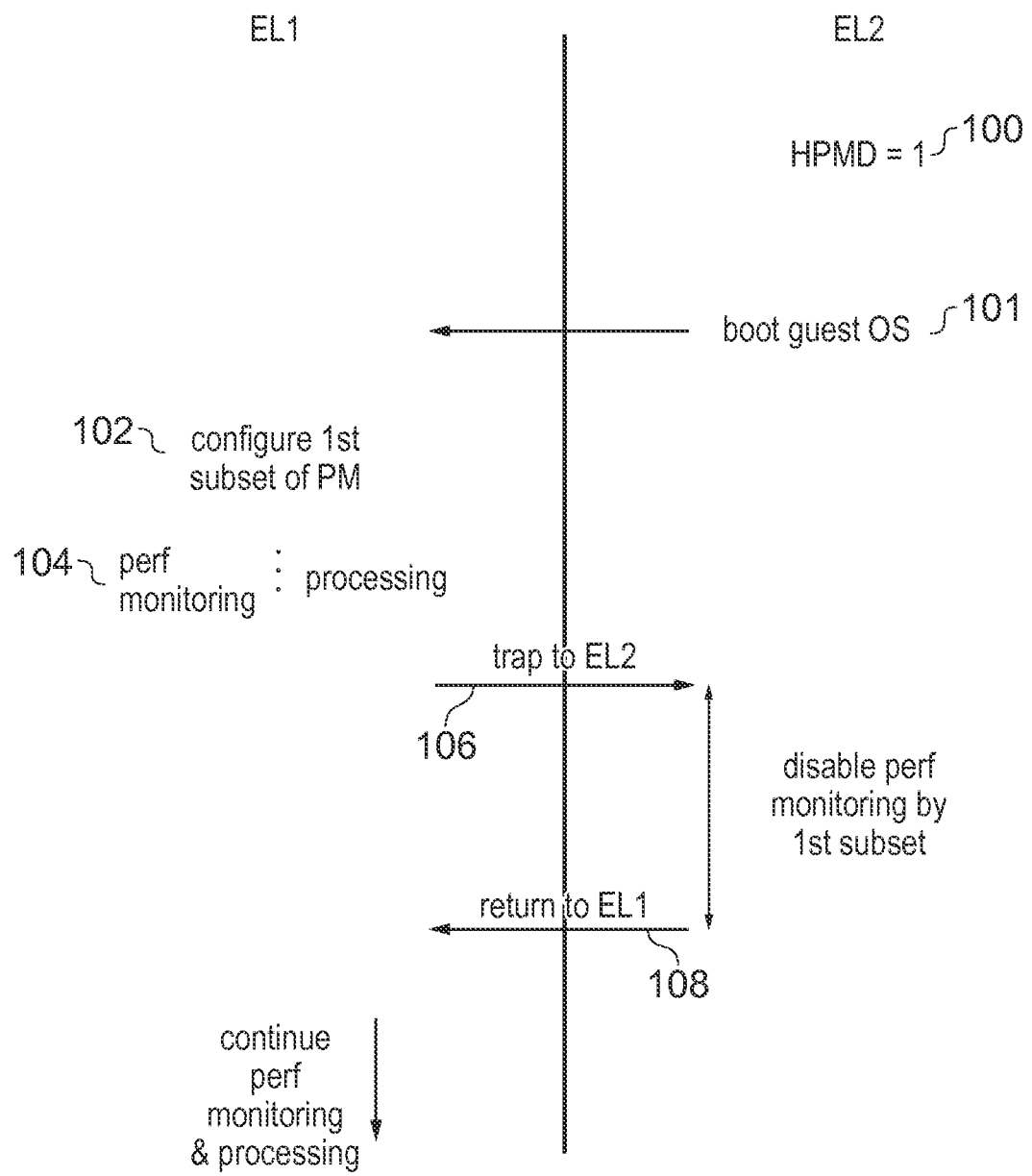
FIG. 6 shows an example of a higher privilege level hiding itself from performance monitors configured as a lower privilege level.

FIG. 6 shows an example of using the disable control flag for hiding code at a higher privilege state from performance counters configured at a lower privilege state. At step 100 code at the second privilege level EL2 sets the disable control flag HPMD to a predetermined value (1 in this example). The hypervisor may also program the boundary defining value HMPN to partition the performance counters into the first and second subset, and/or configure the second subset to count events and set the second enable flag 56 to 1 to enable the second subset 52. The second subset will then continue to count events through the sequence of FIG. 6. At step 101 the hypervisor at EL2 boots a guest operating system, and so processing switches to the first privilege level EL1. At step 102, code operating at the first privilege level EL1 sets the configuration data 12 so that the first subset 50 of performance monitor circuits track various events. Performance monitoring and processing then continues in the first privilege level EL1 at step 104. At step 106 an event occurs which causes a trap to the second privilege level EL2. On switching privilege states, since the disable control flag HPMD is set to the predetermined value then performance monitoring by the first subset value of performance monitors is disabled. Once the code at the second privilege level has finished its operations, then at step 108 processing returns to the first privilege level EL1, and at this point the first subset of performance monitor circuits resume performance monitoring, and processing continues at step 110. In this way, by simply setting a single bit in the disable control flag, the processor 4 can prevent code at a lower privilege level controlling profiling of code at a higher privilege level which could pose a security risk. The performance monitoring control circuitry 10 provided in hardware controls whether performance monitoring is enabled based on the disable control flag HPMD.

While the above examples show a case where the disable control flag 58 is set to 1 to disable performance monitoring by the first subset of counters 50, in other cases the predetermined value could be 0. Also, while FIG. 4 shows a particular arrangement of registers and configuration data, in other examples the configuration data could be represented in different ways or in different combinations of registers.

If a higher privilege state disables performance monitoring using one of the second enable bits 56, 66, then code executing at a lower privilege level may still attempt to read or write one of the performance counters. To prevent inappropriate access to performance count values during this time it is possible for the performance monitoring control circuitry 10 to return a default value in response to a read to the performance counter or to disable writes to the performance counter. For example, a multiplexer may select whether to return the actual data from the performance counter or a default value based on whether performance monitoring is disabled. Similarly, on writing to the performance counters, a write enable signal may be gated based on whether performance monitoring is enabled.

Also, if a lower privilege state attempts to access or configure a performance counter which is not in the subset of counters which it is allowed to configure, then similarly a default value may be returned in response to a read, or a write to the performance counter may be disabled. Hence, the performance monitoring control circuitry 10 may detect based on an index of the performance counter being accessed and the current value of the boundary value 54, 64, whether the code at a lower privilege level is attempting to read or write to a performance counter outside its subset, and if so then apply the default value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

The invention claimed is:

1. A data processing apparatus comprising:
   processing circuitry configured to execute program instructions at a plurality of privilege levels; and
   a plurality of performance monitoring circuits, wherein the processing circuitry is configured to set, in response to at least one program instruction executed by the processing circuitry at a first privilege level, first configuration data for controlling performance monitoring by a first subset of performance monitoring circuits;
   the processing circuitry is configured to set a disable control flag in response to at least one program instruction executed by the processing circuitry at a second privilege level higher than the first privilege level; and
   the apparatus comprises performance monitoring control circuitry configured to disable performance monitoring by said first subset of performance monitoring circuits while the processing circuitry is executing instructions at the second privilege level if said disable control flag has a predetermined value,
   wherein the performance monitoring control circuitry is configured to enable performance monitoring by the first subset of performance monitoring circuits while the processing circuitry is executing program instructions at the first privilege level even if the disable control flag has the predetermined value.

2. The data processing apparatus according to claim 1, wherein the processing circuitry is configured to set, in response to at least one program instruction executed by the processing circuitry at the second privilege level, second configuration data for controlling performance monitoring by a second subset of performance monitoring circuits.

3. The data processing apparatus according to claim 2, wherein the performance monitoring control circuitry is configured to permit performance monitoring by the second subset of performance monitoring circuits while the performance monitoring by the first subset of performance monitoring circuits is disabled.

4. The data processing apparatus according to any of claim 2, wherein the processing circuitry is configured to set, in response to at least one program instruction executed by the processing circuitry at the second privilege level, allocation data for controlling which performance monitoring circuits are within the first subset of performance monitoring circuits and which performance monitoring circuits are within the second subset of performance monitoring circuits.

5. The data processing apparatus according to claim 4, wherein the plurality of performance monitoring circuits have a predetermined sequence with each of the performance monitoring circuits having a predetermined position within the sequence; and
the allocation data is indicative of a boundary position within the sequence, wherein the first subset of performance monitoring circuits comprises the performance monitoring circuits on one side of the boundary position and the second subset of performance monitoring circuits comprises at least the performance monitoring circuits on the other side of the boundary position.

6. The data processing apparatus according to claim 1, wherein the performance monitoring circuits comprise event tracking circuits configured to track the occurrence of selected events within the data processing apparatus.

7. The data processing apparatus according to claim 1, wherein the first subset of performance monitoring circuits comprises at least one programmable event tracking circuit configured to track the occurrence of a type of event specified by the first configuration data.

8. The data processing apparatus according to claim 1, wherein the first subset of performance monitoring circuits comprises at least one fixed event tracking circuit configured to track the occurrence of a predetermined type of event.

9. The data processing apparatus according to claim 1, wherein the first configuration data comprises enable data for controlling whether performance monitoring by the first subset of performance monitoring circuits is enabled or disabled.

10. The data processing apparatus according to claim 1, wherein the second privilege level comprises a hypervisor privilege level for executing a hypervisor program, and the first privilege level comprises an operating system privilege level for executing one or more operating system programs.

11. The data processing apparatus according to claim 1, wherein the second privilege level comprises at least one secure privilege level for executing at least one secure program and the first privilege level comprises at least one less secure privilege level for executing at least one less secure program, wherein in the at least one secure privilege level the processing circuitry has access to at least one resource that is inaccessible to the processing circuitry when in the at least one less secure privilege level.

12. The data processing apparatus according to claim 1, wherein the first subset of performance monitoring circuits comprises a third subset of performance monitoring circuits;
the processing circuitry is configured to set, in response to at least one program instruction executed by the processing circuitry at a third privilege level lower than the first privilege level, third configuration data for controlling performance monitoring by the third subset of performance monitoring circuits;
the processing circuitry is configured to set a further disable control flag in response to at least one program instruction executed by the processing circuitry at one of the first and second privilege levels; and
the performance monitoring control circuitry is configured to disable performance monitoring by said third subset of performance monitoring circuits while the processing circuitry is executing instructions at one of the first and second privilege levels if the further disable control flag has a predetermined value.

13. A data processing apparatus comprising:
processing means for executing program instructions at a plurality of privilege levels; and
a plurality of performance monitoring means for performing performance monitoring, wherein the processing means is configured to set, in response to at least one program instruction executed by the processing means at a first privilege level, first configuration data for controlling performance monitoring by a first subset of performance monitoring means;
the processing means is configured to set a disable control flag in response to at least one program instruction executed by the processing means at a second privilege level higher than the first privilege level; and
the apparatus comprises performance monitoring control means for disabling performance monitoring by said first subset of performance monitoring means while the processing means is executing instructions at the second privilege level if said disable control flag has a predetermined value,
wherein the performance monitoring control means is configured to enable performance monitoring by the first subset of performance monitoring means while the processing means is executing program instructions at the first privilege level even if the disable control flag has the predetermined value.

14. A performance monitoring method for a data processing apparatus comprising a plurality of performance monitoring circuits, comprising:
in response to at least one program instruction executed at a first privilege level, setting first configuration data for controlling performance monitoring by a first subset of performance monitoring circuits; and
disabling performance monitoring by said first subset of performance monitoring means if the data processing apparatus is executing program instructions at a second privilege level higher than the first privilege level and a disable control flag set in response to at least one instruction executed at the second privilege level has a predetermined value,
wherein the performance monitoring control circuitry is configured to enable performance monitoring by the first subset of performance monitoring circuits while the data processing apparatus is executing program instructions at the first privilege level even if the disable control flag has the predetermined value.

* * * * *